United States Patent [19]

Matsumoto

[11] Patent Number: 5,729,651
[45] Date of Patent: Mar. 17, 1998

[54] VIDEO SIGNAL WITH SUPER IMPOSE CHARACTER DATA REPRODUCING APPARATUS

[75] Inventor: Tokikazu Matsumoto, Osaka, Japan

[73] Assignee: Matsushita Electric Industrial Co., Ltd., Osaka, Japan

[21] Appl. No.: 781,597

[22] Filed: Jan. 9, 1997

Related U.S. Application Data

[63] Continuation of Ser. No. 423,157, Apr. 17, 1995, abandoned.

[30] Foreign Application Priority Data

Apr. 18, 1994 [JP] Japan ................................. 6-078343

[51] Int. Cl.[6] ............................................ H04N 9/80
[52] U.S. Cl. ............................. 386/95; 386/33; 386/40
[58] Field of Search .............................. 386/1, 33, 34, 386/40, 44, 45, 46, 95, 111, 112, 125, 98; 348/468; H04N 5/76, 5/92, 9/80

[56] References Cited

U.S. PATENT DOCUMENTS

| | | |
|---|---|---|
| 5,027,193 | 6/1991 | Kani et al. ............................. 358/310 |
| 5,097,348 | 3/1992 | Suetaka .................................. 358/335 |
| 5,150,113 | 9/1992 | Blithgen ................................. 358/342 |
| 5,237,424 | 8/1993 | Nishino et al. ........................ 358/310 |
| 5,406,381 | 4/1995 | Han ....................................... 358/335 |
| 5,455,684 | 10/1995 | Fujinami et al. ..................... 358/335 |

OTHER PUBLICATIONS

"Recommended Practice for Line 21 Data Service", draft EIA–608, pp. 7–9, issued Jun. 17, 1993.

*Primary Examiner*—Thai Tran
*Assistant Examiner*—Huy Nguyen
*Attorney, Agent, or Firm*—Greenblum & Bernstein P.L.C.

[57] ABSTRACT

A video signal with superimpose character data reproducing apparatus reproduces MPEG compressed video signal from a CD-ROM. The compressed video signal read from the disc includes a plurality of blocks each having a header with a character data. The compressed video signal is expanded by an expander to a plurality of component signals, which are then modulated in modulator to a composite video signal. An extractor extracts the character data and temporarily stores it in flop-flops. The extracted character data is serially inserted in the composite video signal by synthesizer in a predetermined timing.

10 Claims, 3 Drawing Sheets

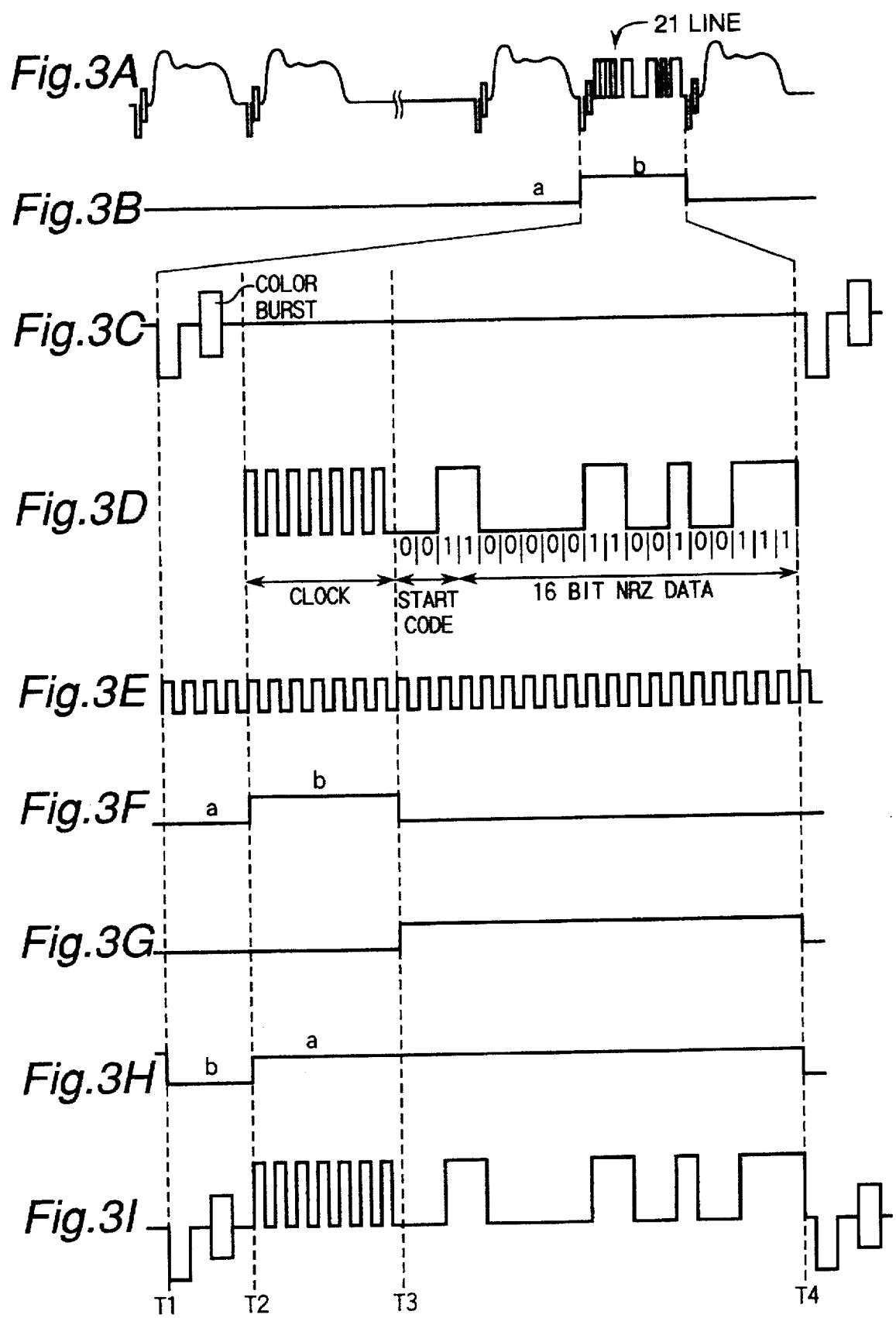

5,729,651

VIDEO SIGNAL WITH SUPER IMPOSE CHARACTER DATA REPRODUCING APPARATUS

This application is a continuation of application Ser. No. 08/423,157, filed Apr. 17, 1995, now abandoned.

BACKGROUND OF THE INVENTION

1. Field of the Invention

The present invention relates to a video signal with superimpose character data reproducing apparatus and, more particularly, to a reproducing apparatus for reproducing compressed video signal compressed by a known compression method, such as MPEG (Moving Picture Experts Group) standard, from a recording medium, such as a disc.

2. Description of the Prior Art

Recently, a number of developments have been made to the technology of recording and reproducing compressed video signal under an MPEG standard (Moving Picture Expert Group). By the use of MPEG standard data compression, it is possible to record a relatively long period moving picture data in a compact disc (CD).

A closed caption system which provides superimpose character data on the screen relatively to the scene, such as for aiding the auditory handicapped, has also been developed. According to this system, the broadcast station sends the video signal in which the character data is inserted in the vertical blanking period. In the television receiver, the inserted character data is extracted and decoded in a format capable of being displayed on the screen as a superimpose.

FIG. 2 shows a block diagram of a prior art video signal reproducing apparatus with the closed caption system. A predetermined horizontal line near the vertical blanking period, such as 21st horizontal line, is assigned for carrying the superimpose character data. The character data for one horizontal line is expressed by 16-bit data expressed by NRZ (Non Return to Zero) modulation. A train of clock pulses are inserted first for the reference clock for synthesizing the NRZ data. After the train of clocks, a predetermined start code is inserted to enable reading of the character data. An example of such a format is disclosed in EIA-608 "Recommended Practice for Line 21 Data Service" issued Jun. 17, 1993, particularly pages 7–9, the entire content of which is expressly incorporated by reference herein.

As shown in FIG. 2, the prior art video signal reproducing apparatus for reproducing a laser disc has a reproducer 12 and an FM demodulator 13. Since the data stored in the laser disc is non-compressed video signal, the video signal in the form of composite signal in FM modulated format is stored. Thus, the recorded data has the 16-bit NRZ superimpose character data inserted in the 21st horizontal line. Reproducer 12 reads the data on the laser disc and FM demodulator 13 demodulates to produce the video signal.

However, when the MPEG standard data compression is used to record video signal in the compressed format, the video signal is recorded not in the form of composite signal, but in the form of Y, U, V component signals. Also, not all the horizontal line signals, but only the horizontal line signals with actual image data are stored for improving the data compression rate. Thus, the character data can not be inserted in the CD-ROM as in the laser disc. When the character data is inserted somewhere in the compressed data block, such as in a user data area in each header of the compressed data block, there is a problem that there needs some arrangement to extract the character data from the header and insert it in the proper position.

SUMMARY OF THE INVENTION

The object of the present invention is therefore to provide a new reproducing apparatus for reproducing the compressed video signal with superimpose character data that can insert the character data in the proper position.

In order to achieve the aforementioned objective, a video signal with superimpose character data reproducing apparatus for reproducing from a recording medium compressed video signal with a plurality of blocks having a character data, said apparatus comprises: reproducing means for reproducing compressed video signal from said recording medium; expander means for expanding the compressed video signal to a plurality of component signals; modulation means for modulating said component signals to a composite video signal; extraction means for extracting the character data from the reproduced compressed video signal; and inserting means for inserting the extracted character data to a predetermined horizontal line in the composite video signal.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which:

FIGS. 3A, 3B, 3C, 3D, 3E, 3F, 3G, 3H and 3I are graphs showing video signal and superimpose character data.

DETAILED DESCRIPTION OF THE PREFERRED EMBODIMENTS

Figure 1A:
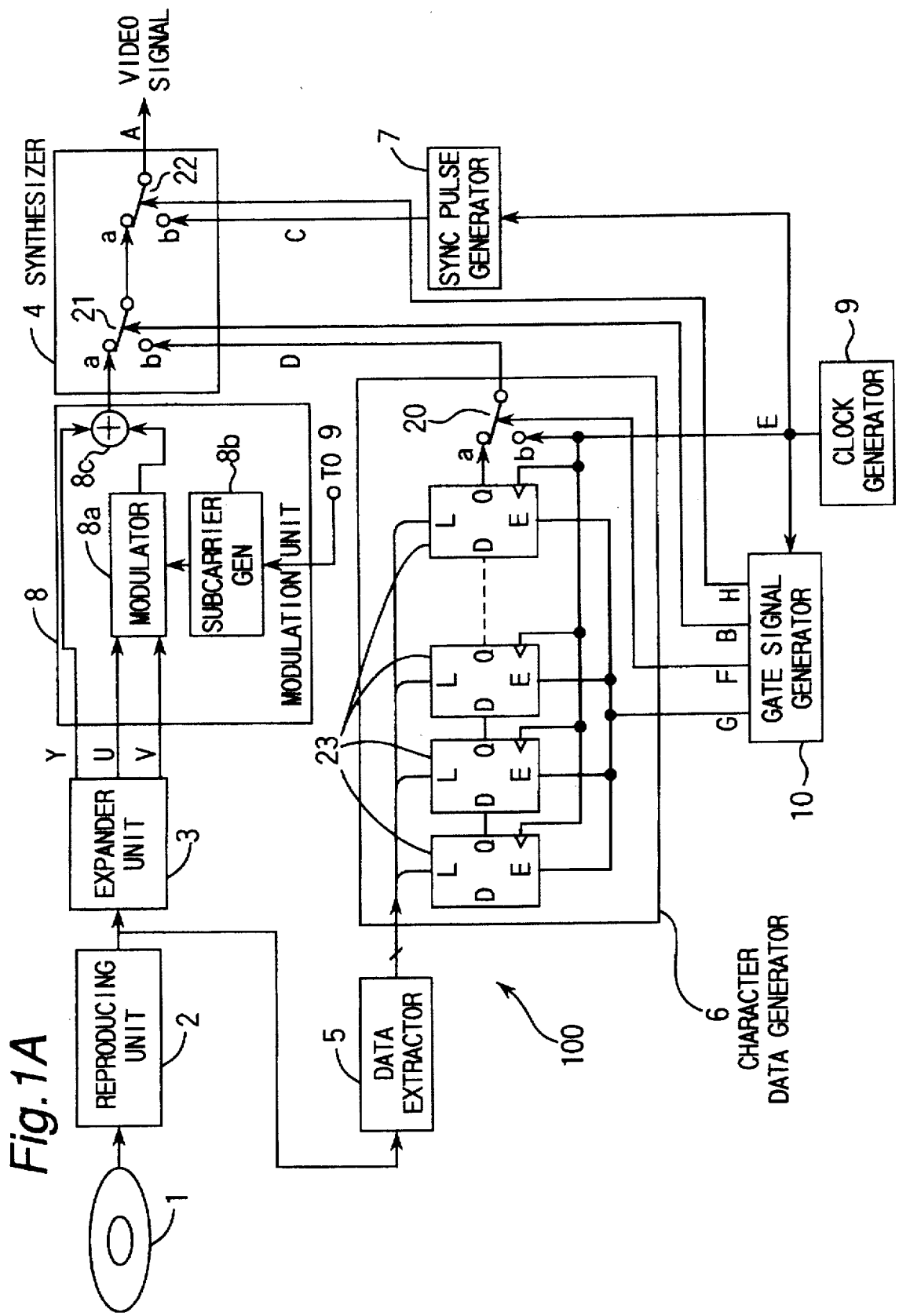
FIG. 1A is a block diagram of a video signal with superimpose character data reproducing apparatus according to the present invention.
Figure 1B:
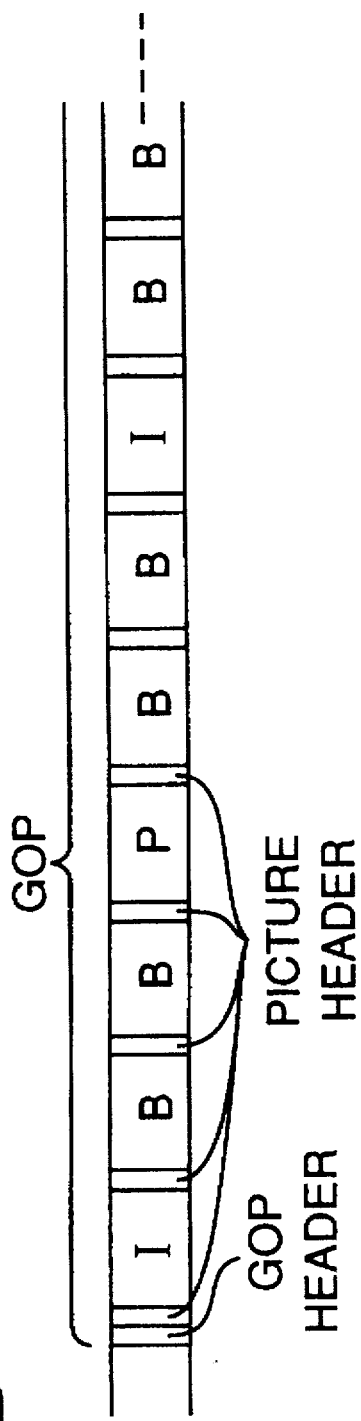
FIG. 1B is a diagram showing a pattern of the compressed video signal as read from a disc.
Figure 2:
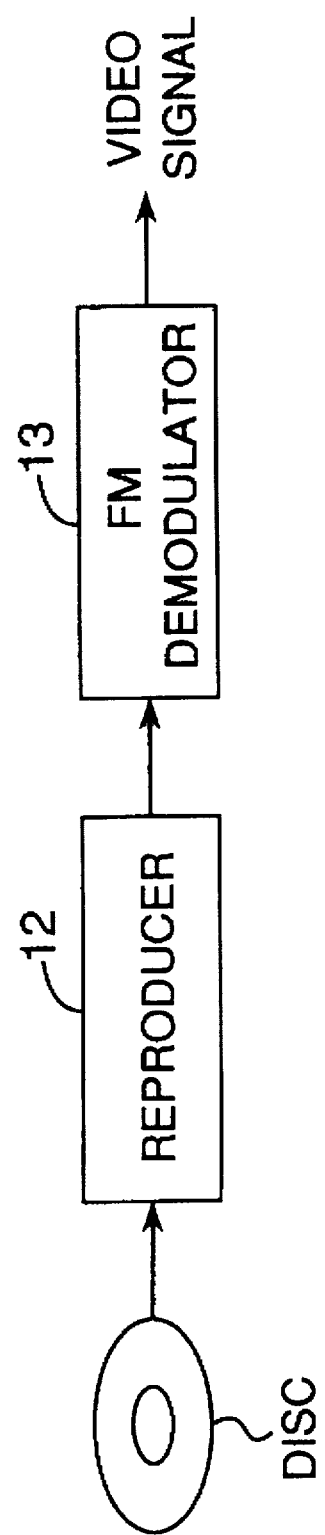
FIG. 2 is a block diagram of a video signal reproducing apparatus according to the prior art.

Referring to FIG. 1A, a video signal with superimpose character data reproducing apparatus 100 according to the present invention has a reproducing unit 2 for reproducing a compressed video signal from a recording medium, such as a disc 1. As shown in FIG. 1B, the compressed signal according to the known compression method, such as MPEG standard, includes a plurality of group of pictures (GOPs). Each GOP includes a GOP header and a plurality pictures following the GOP header, such as I-picture (intra frame), B-picture (bidirectional interpolated frame) and P-picture (predictive frame), which are provided, for example, in a pattern I,B,B,P,B,B, repeatedly, as shown in FIG. 1B. Each GOP has a GOP header carrying various format information for the GOP, and also each picture data has a picture header carrying various format information for the picture. It is noted that each of the GOP headers and picture headers has a user data area in which any desired appropriate data of a limited length can be inserted by a user. According to the embodiment, it is assumed that a superimpose character data is inserted in all or in some of the GOP headers and/or picture headers. It is possible to insert the superimpose character data in any other place such as in a predetermined sector in the disc.

An expander unit 3 expands the compressed video signal, i.e., the I-picture data, B-picture data and P-picture data, to three component video signals which are luminance signal Y, and two color difference signals-U (=Y−B) and V (=Y−R).

A modulation unit 8 has modulator 8a, subcarrier generator 8b and adder 8c. The modulator 8a modulates the color difference signals U and V by a subcarrier signal (3.58 MHz) from a subcarrier generator 8b and produces a modulated signal. The adder 8c adds the modulated signal and the luminance signal Y to produce a composite video signal, such as an NTSC signal.

A data extractor 5 detects all or some of the GOP headers and picture headers in which the superimpose character data is carried and extracts a 19 bit long superimpose character data. For extracting particular headers that carry the superimpose character data, a suitable flag may be added in the header to distinguish such headers. Of the 19 bit long superimpose character data, the first three bits are used as the start code and the remaining 16 bits (=2 bytes) are used for two characters in ASCII code. Of the 16 bits, it is possible to use some number of bits for additional information, such as a color of the character. Since there are 30 pictures (frames) in one second, 60 characters per second can be extracted, provided that the superimposed data is carried in each of I-picture, B-picture and P-picture.

In the case where the superimpose character data is inserted in a predetermined sector in the disc, the data extractor 5 detects such a sector and extracts the superimpose character data from the detected sector.

A character data generator 6 has nineteen flip-flops 23 and a switch 20. The character data generator 6 operates in association with a gate signal generator 10 and also a clock generator 9. Each flip-flop 23 has terminal L, terminal D, terminal Q and terminal E. The load terminals L of nineteen flip-flops 23 are connected to nineteen parallel outputs of the data extractor 5. Nineteen flip-flops are connected in a cascade manner such that the terminal Q of the first flip-flop is connected the terminal D of the next flip-flop, and so on, and the terminal Q of the last flip-flop is connected to a terminal a of switch 20. The terminals E of all the flip-flops are connected together to receive an enable pulse (FIG. 3G) from the gate signal generator 10. Each of the flip-flops has a clock terminal for receiving clocks (FIG. 3E) from the clock generator 9. The terminal b of switch 20 also receives the clocks from clock generator 9. The switch 20 is switched by control signal (FIG. 3F).

A synthesizer 4 has switches 21 and 22, and operates in association with the gate signal generator 10 and also a sync pulse generator 7. A terminal a of switch 21 is connected to the output of modulation unit 8 for receiving the NSTC composite signal, and a terminal b of switch 21 is connected to the output of switch 20, i.e., the output of the character data generator 6. A terminal a of switch 22 is connected to the output of switch 21, and a terminal b thereof is connected to sync pulse generator 7 for receiving the sync pulses (FIG. 3C). The switches 21 and 22 are switched by control signals (FIGS. 3B and 3H).

Next, the operation of the video signal with superimpose character data reproducing apparatus 100 is described with reference to the waveforms shown in FIGS. 3A–3I.

In operation, at the very beginning of each frame, data extractor 5 reads the user data from the picture header, and extracts a 16 bit NRZ superimpose character data, which is assumed to be 1000001100100111 as an example. Then, data extractor 5 adds a 3-bit start code, such as 001, to the 16-bit NRZ superimpose character data to make a 19-bit NRZ data, 0011000001100100111, which is applied in parallel to and loaded in nineteen flip-flops 23 at their data load terminals L. The 3-bit start code can be added in the character data generator 6.

Then, at time T1, upon detection of the starting edge of the 21st horizontal line, gate signal generator 10 produces a HIGH level signal B (FIG. 3B) to turn switch 21 to connect its terminal b and, at the same time, a LOW level signal H (FIG. 3H) to turn switch 22 to connect its terminal b. Thus, a horizontal sync pulse and a color burst signal from sync pulse generator 7 are produced from switch 22.

Then, at time T2, which is immediately after the color burst signal, gate signal generator 10 produces a HIGH level signal H (FIG. 3H) to turn switch 22 to connect its terminal a and, at the same time, a HIGH level signal F (FIG. 3F) to turn switch 20 to connect its terminal b. Thus, from time T2, a train of clock pulses from clock generator 9 is produced from switch 22.

Then, at time T3, that is after producing a predetermined number of clocks from time T2, gate signal generator 10 produces a HIGH level signal G (FIG. 3G) which is provided to enable terminals E of flip-flops 23. During the enable terminals E receive a HIGH level signal, the 19-bit data stored in nineteen flip-flops 23 is sequentially shifted out from the last flip-flop 23 in synchronized manner with clock pulses. Thus, the 19-bit NRZ data, inclusive of the start code and the 16-bit NRZ superimpose character data, is sequentially produced from switch 22.

Then, at time T4, that is when the 19-bit NRZ data is completely produced from switch 22, gate signal generator 10 produces a LOW level signal G (FIG. 3G) to stop the data shifting in the nineteen flip-flops 23 and, at the same time, a LOW level signal H (FIG. 3H) to connect its terminal b. Thus, after time T4, a horizontal sync pulse and a color burst signal from sync pulse generator 7 are produced from switch 22 for the 22nd horizontal line.

Thus, during the 21st horizontal line period, data I as shown FIG. 3I is produced from switch 22.

By the video signal with superimpose character data reproducing apparatus 100 of the present invention, the character data inserted in the 21st horizontal line, as shown in FIG. 3A, can be obtained without any pattern generator or memory.

In the above embodiment, instead of ACII code, any other codes can be used. Also, the data can be any other format than the NRZ format.

Also, in the above embodiment, switch 21 is turned to terminal b before the insertion of the sync pulse from the sync pulse generator 7, but can be after the insertion of the sync pulse.

Furthermore, the synthesizer 4 can be inserted in a line carrying the luminance signal Y, or in an output line of modulator 8a.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A reproducing apparatus for reproducing a video signal and superimpose character data from a compressed video signal on a recording medium, said compressed signal including a plurality of blocks having character data, said apparatus comprising:

reproducing means for reproducing said compressed video signal from said recording medium;

expander means for expanding said compressed video signal to a plurality of component signals;

modulation means for modulating said plurality of component signals to a composite video signal, said modulating means modulating at least one of said plurality of component signals by a subcarrier, and adding said modulated at least one of said plurality of component signals to another of said plurality of component signals;

extraction means for extracting the character data from at least one of said plurality of blocks of the reproduced compressed video signal; and inserting means for inserting said extracted character data to a predetermined horizontal line in said composite video signal.

2. A video signal with superimpose character data reproducing apparatus as claimed in claim 1, wherein said insertion means comprises:

a plurality of flip-flops connected in series for receiving said extracted character data;

signal generation means for generating clock signals applied to said flip-flops for serially producing said character data; and switch means for inserting the serially produced character data in said composite video signal.

3. A video signal with superimpose character data reproducing apparatus as claimed in claim 1, wherein said character data is in ASCII code, and wherein said extraction means extracts and produces said character data in a Non Return to Zero modulated format.

4. A video signal with superimpose character data reproducing apparatus as claimed in claim 1, wherein said character data is carried in a header of said blocks, and wherein said extraction means detects said header.

5. A video signal with superimpose character data reproducing apparatus as claimed in claim 1, wherein said character data is carried in a predetermined sector of said recording medium, and wherein said extraction means detects said predetermined sector.

6. A video signal reproducing apparatus for reproducing a compressed video signal and superimposed character data stored in a plurality of blocks on a recording medium, said reproducing apparatus comprising:

a reproducing unit, said reproducing unit reproducing said compressed video signal from said recording medium, said compressed video signal comprising a group of pictures, a header, and a plurality of picture frames;

an expander unit, said expander unit expanding said plurality of pictures into a luminance signal, a first color difference signal, and a second color difference signal;

a modulator unit, said modulator unit modulating said first color difference signal and said second color difference signal to produce a first modulated signal and a second modulated signal, said modulator unit comprising an adder to add one of said first and second modulated signals to the luminance signal;

a data extractor unit, said data extractor unit detecting said header, said header comprising said superimposed character data;

a character data generator, said character data generator connected to said data extractor unit; and a synthesizer, said synthesizer outputting said superimposed character data.

7. The video signal reproducing device according to claim 6, wherein said modulator unit adds said modulated signal to said luminance signal to produce a composite video signal.

8. The video signal reproducing device according to claim 7, said synthesizer outputting said superimpose character data to a predetermined horizontal line of said composite video signal.

9. The video signal reproducing device according to claim 6, said superimpose character data comprising ASCII data.

10. The video signal reproducing device according to claim 6, said superimpose character data being serially loaded into said character data generator.

* * * * *